US012683310B2

(12) United States Patent
Yamashita et al.

(10) Patent No.: US 12,683,310 B2
(45) Date of Patent: Jul. 14, 2026

(54) CONNECTOR SYSTEM

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Masanao Yamashita, Osaka (JP); Toshifumi Ichio, Osaka (JP); Hiroaki Tsutsumi, Mie (JP); Maika Ido, Mie (JP); Hidekazu Matsuda, Mie (JP); Kazuki Hiramatsu, Mie (JP); Taiga Kadoyama, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 337 days.

(21) Appl. No.: 18/291,758

(22) PCT Filed: Jun. 29, 2022

(86) PCT No.: PCT/JP2022/025901

§ 371 (c)(1),
(2) Date: Jan. 24, 2024

(87) PCT Pub. No.: WO2023/008059

PCT Pub. Date: Feb. 2, 2023

(65) Prior Publication Data

US 2024/0170873 A1 May 23, 2024

(30) Foreign Application Priority Data

Jul. 27, 2021 (JP) ................................ 2021-122616

(51) Int. Cl.
*H01R 12/75* (2011.01)

(52) U.S. Cl.
CPC .................................... *H01R 12/75* (2013.01)

(58) Field of Classification Search
CPC ...................................................... H01R 12/75
(Continued)

(56) References Cited

U.S. PATENT DOCUMENTS 4,993,971 A * 2/1991 Matsuzaki ......... H01R 13/6585 439/607.35
5,059,140 A * 10/1991 Philippson ......... H01R 13/6593 439/607.02

(Continued)

FOREIGN PATENT DOCUMENTS

JP H04-345778 A 12/1992
JP H08-022867 A 1/1996
JP 2011-049118 A 3/2011

OTHER PUBLICATIONS

International Search Report issued on Aug. 16, 2022 for WO 2023/008059 A1 (6 pages).

*Primary Examiner* — Gary F Paumen
(74) *Attorney, Agent, or Firm* — Venjuris, P.C.

(57) ABSTRACT

A connector system (1) is provided with a cable-side connector (10) to be connected to an end part of a cable (11) and a plurality of types of board-side connectors (110, 210) to be connected to a circuit board. The cable-side connector (10) includes a cable-side inner conductor (12), a cable-side outer conductor (13) and a cable-side connector housing (14). Each of the plurality of types of board-side connectors (110, 210) includes a board-side inner conductor (113, 213), a board-side outer conductor (111, 211) and a board-side connector housing (114, 214). The plurality of types of board-side connectors (110, 210) include mutually different board-side outer conductors (111, 211). One board-side (Continued)

connector selected from the plurality of types of board-side connectors (110, 210) is connected to the cable-side connector (10).

2 Claims, 8 Drawing Sheets

(58) Field of Classification Search
USPC ................................ 439/78, 607.35, 607.41
See application file for complete search history.

(56) References Cited

U.S. PATENT DOCUMENTS

| | | | | |
|---|---|---|---|---|
| 6,135,818 | A * | 10/2000 | Lang | H01R 13/6592 439/607.41 |
| 6,776,665 | B2 * | 8/2004 | Huang | H01R 13/6581 439/607.41 |
| 6,902,432 | B2 * | 6/2005 | Morikawa | H01R 13/6275 439/607.41 |
| 8,303,343 | B2 * | 11/2012 | Nagata | H01R 13/6582 439/607.54 |
| 9,972,950 | B2 * | 5/2018 | Kawakami | H01R 13/6594 |
| 10,714,872 | B2 * | 7/2020 | Maesoba | H01R 13/6463 |
| 10,886,669 | B2 * | 1/2021 | Takahashi | H01R 12/721 |
| 11,710,933 | B2 * | 7/2023 | Maesoba | H01R 9/03 439/607.41 |
| 2005/0215122 | A1 * | 9/2005 | Nishida | H01R 13/648 439/607.41 |
| 2011/0143594 | A1 | 6/2011 | Nagata | |
| 2015/0255905 | A1 * | 9/2015 | Little | H01R 13/6585 439/78 |
| 2016/0056585 | A1 * | 2/2016 | Dunwoody | H01R 13/6592 439/607.41 |
| 2016/0315427 | A1 | 10/2016 | Kawakami et al. | |
| 2019/0312388 | A1 | 10/2019 | Maesoba et al. | |
| 2020/0091661 | A1 | 3/2020 | Takahashi | |
| 2022/0052494 | A1 | 2/2022 | Maesoba et al. | |
| 2022/0102885 | A1 | 3/2022 | Maesoba et al. | |

* cited by examiner

CONNECTOR SYSTEM

CROSS REFERENCE TO RELATED APPLICATIONS

This application is a national phase of PCT application No. PCT/JP2022/025901, filed on 29 Jun. 2022, which claims priority from Japanese patent application No. 2021-122616, filed on 27 Jul. 2021, all of which are incorporated herein by reference.

TECHNICAL FIELD

The present disclosure relates to a connector system.

BACKGROUND

Conventionally, a board connector to be mounted on a circuit board is known from Japanese Patent Laid-Open Publication No. 2011-049118 (Patent Document 1) and Japanese Patent Laid-Open Publication No. 2020-109738 (Patent Document 2).

A board-side connector described in Japanese Patent Laid-Open Publication No. 2011-049118 includes an outer conductor made of a metal plate material. By forming the outer conductor by bending the metal plate material, manufacturing cost is reduced.

A board-side connector described in Japanese Patent Laid-Open Publication No. 2020-109738 includes an outer conductor formed by casting, die casting, cutting or the like. No gap is formed in the outer conductor formed by the above method, unlike an outer conductor made of a metal plate material. Thus, this board-side connector is less likely to be affected by noise, wherefore application to high-speed communication is possible. However, there is a problem that manufacturing cost increases as compared to the outer conductor made of the metal plate material.

PRIOR ART DOCUMENT

Patent Document

Patent Document 1: JP 2011-049118 A
Patent Document 2: JP 2020-109738 A

SUMMARY OF THE INVENTION

Problems to be Solved

The outer conductor made of the metal plate material and the outer conductor formed by casing or the like are different in shape. Thus, the board-side connector including the outer conductor made of the metal plate material and the board-side connector including the outer conductor formed by casting or the like are individually designed.

Conventionally, a cable connector to be connected to a board-side connector has been individually designed to correspond to the individually designed board-side connector. Thus, there has been a problem that manufacturing cost increases for both the board-side connector and the cable connector.

The present disclosure was completed on the basis of the above situation and aims to provide a technique on a connector system with reduced manufacturing cost.

Means to Solve the Problem

The present disclosure is directed to a connector system with a cable-side connector to be connected to an end part of a cable and a plurality of types of board-side connectors to be connected to a circuit board, the cable-side connector including a cable-side inner conductor connected to the end part of the cable, a cable-side outer conductor made of metal for covering the cable-side inner conductor while being electrically insulated from the cable-side inner conductor, and a cable-side connector housing made of synthetic resin for holding the cable-side outer conductor, each of the plurality of types of board-side connectors including a board-side inner conductor to be connected to an electrically conductive path provided in the circuit board, a board-side outer conductor made of metal for covering the board-side inner conductor while being electrically insulated from the board-side inner conductor, and a board-side connector housing made of synthetic resin for holding the board-side outer conductor, the cable-side inner conductor and the board-side inner conductor being electrically connectable, the cable-side outer conductor and the board-side outer conductor being electrically connectable, and the cable-side connector housing and the board-side connector housing being connectable, the plurality of types of board-side connectors including mutually different board-side outer conductors, and one board-side connector selected from the plurality of types of board-side connectors being connected to the cable-side connector.

Effect of the Invention

According to the present disclosure, the manufacturing cost of a connector can be reduced.

DETAILED DESCRIPTION TO EXECUTE THE INVENTION

Description of Embodiments of Present Disclosure

Figure 1:
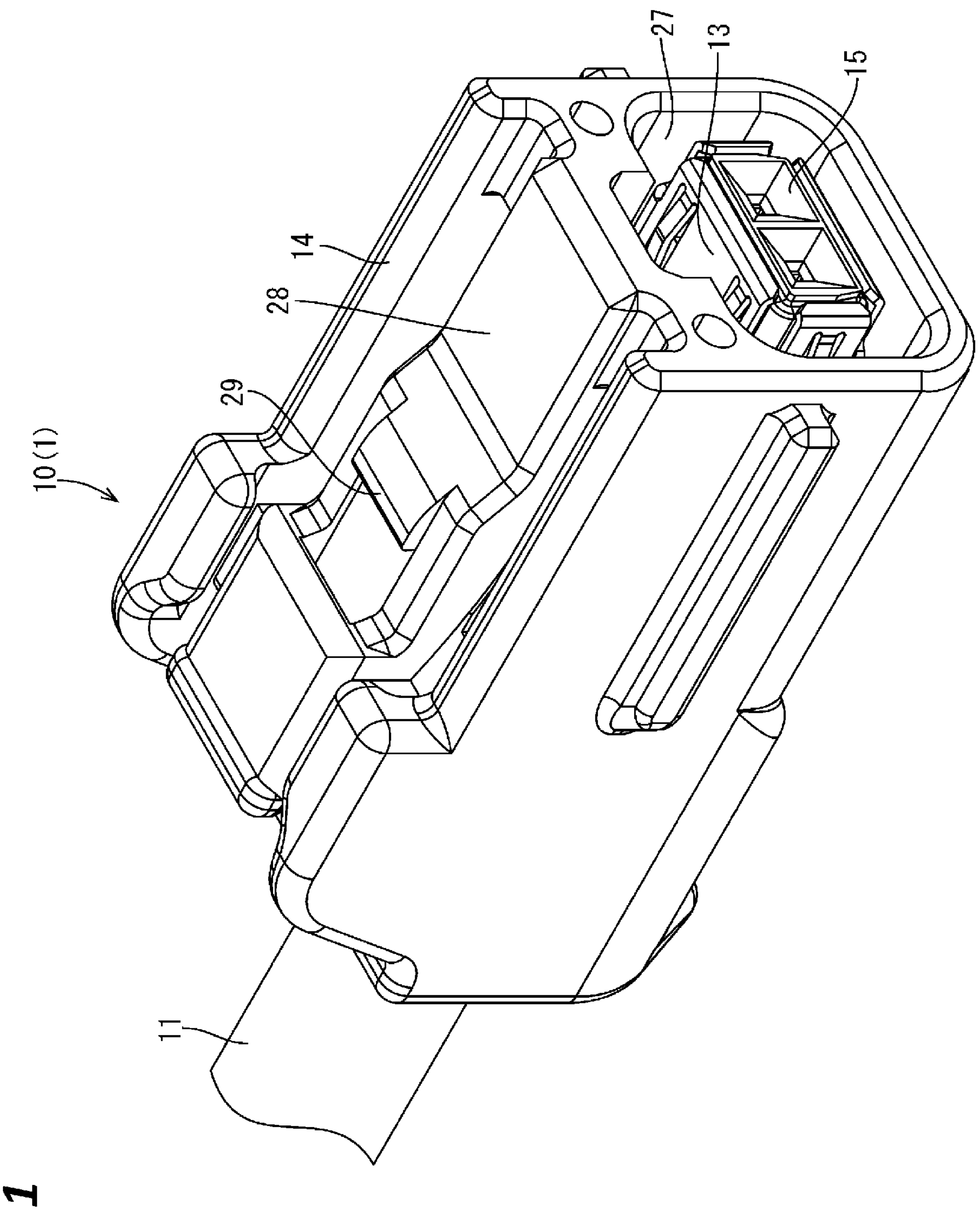
FIG. 1 is a perspective view showing a cable-side connector according to one embodiment.

First, embodiments of the present disclosure are listed and described.

(1) The connector system of the present disclosure is provided with a cable-side connector to be connected to an end part of a cable and a plurality of types of board-side connectors to be connected to a circuit board, the cable-side connector including a cable-side inner conductor connected to the end part of the cable, a cable-side outer conductor made of metal for covering the cable-side inner conductor while being electrically insulated from the cable-side inner conductor, and a cable-side connector housing made of synthetic resin for holding the cable-side outer conductor, each of the plurality of types of board-side connectors including a board-side inner conductor to be connected to an electrically conductive path provided in the circuit board, a board-side outer conductor made of metal for covering the board-side inner conductor while being electrically insulated from the board-side inner conductor, and a board-side connector housing made of synthetic resin for holding the board-side outer conductor, the cable-side inner conductor and the board-side inner conductor being electrically connectable, the cable-side outer conductor and the board-side outer conductor being electrically connectable, and the cable-side connector housing and the board-side connector housing being connectable, the plurality of types of board-side connectors including mutually different board-side outer conductors, and one board-side connector selected from the plurality of types of board-side connectors being connected to the cable-side connector.

Since the cable-side outer conductor and the cable-side inner conductor of the cable-side connector can be shared for the plurality of types of board-side connectors, manufacturing cost can be reduced as compared to the case where the cable-side connectors are individually designed for the plurality of types of board-side connectors.

Further, since the cable-side connector housing can also be shared, manufacturing cost can be further reduced.

(2) Preferably, the plurality of types of board-side connectors include a first board-side connector having a first board-side outer conductor formed from a bent metal plate material and a second board-side connector having a second board-side outer conductor formed by casting.

The manufacturing cost of the first board-side connector can be reduced by forming the first board-side outer conductor from the metal plate material. The shielding performance of the second board-side connector can be improved by forming the second board-side outer conductor by casting.

(3) Preferably, the first board-side outer conductor of the first board-side connector includes a first fitting tube portion having a tubular shape and to be fit to the cable-side outer conductor, the first fitting tube portion includes a mating end part where end edges of the metal plate material constituting the first board-side outer conductor are in contact with each other, and the cable-side outer conductor includes a resiliently deformable resilient contact portion and the resilient contact portion resiliently contacts a part of the first fitting tube portion different from the mating end part.

Since a resilient force from the first board-side outer conductor is not applied to the mating end part, it is suppressed that the end edges of the metal plate material constituting the mating end part are deformed away from each other.

DETAILS OF EMBODIMENT OF PRESENT DISCLOSURE

An embodiment of the present disclosure is described below. The present disclosure is not limited to these illustrations, but is represented by claims and intended to include all changes in the scope of claims and in the meaning and scope of equivalents.

Embodiment

The embodiment of the present disclosure is described with reference to FIGS. 1 to 8. A connector system 1 according to this embodiment is mounted, for example, in a vehicle (not shown) such as an electric or hybrid vehicle, and disposed, for example, in a wired communication path between an in-vehicle electrical component (car navigation system, ETC, monitor or the like) in the vehicle and an external device (camera or the like) or between in-vehicle electrical components. The connector system 1 is provided with a cable-side connector 10, a first board-side connector 110 and a second board-side connector 210 different from the first board-side connector 110. The cable-side connector 10 is connected to one connector selected from the first board-side connector 110 and the second board-side connector 210. In the following description, a connection direction of each of the cable-side connector 10, the first board-side connector 110 and the second board-side connector 210 is referred to as a forward direction. Further, for a plurality of identical members, only some members may be denoted by a reference sign and the other members may not be denoted by the reference sign.

[Cable-Side Connector 10]

Figure 2:
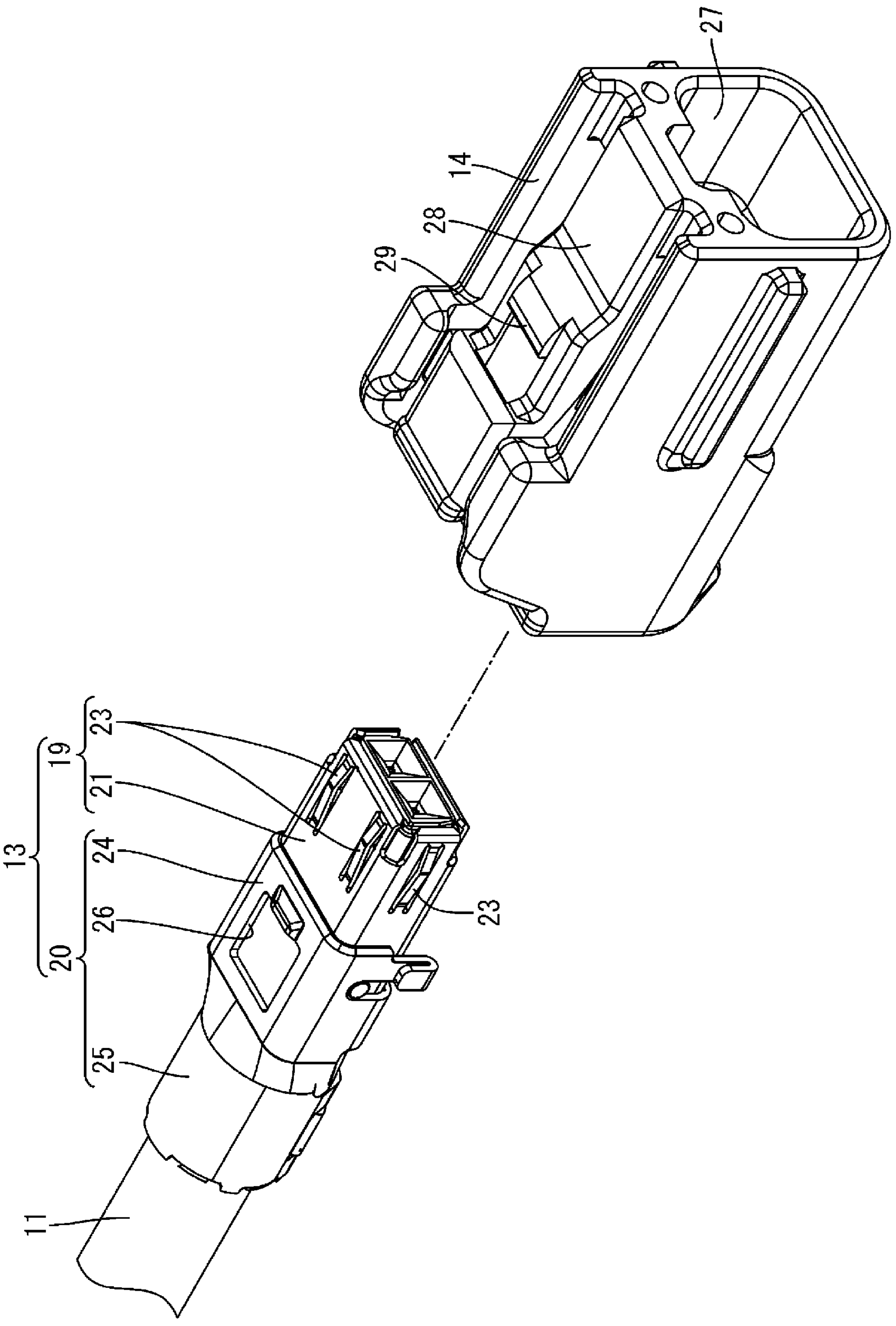
FIG. 2 is an exploded perspective view showing a cable-side connector housing and a cable-side outer conductor connected to an end part of a cable in the cable-side connector.
Figure 3:
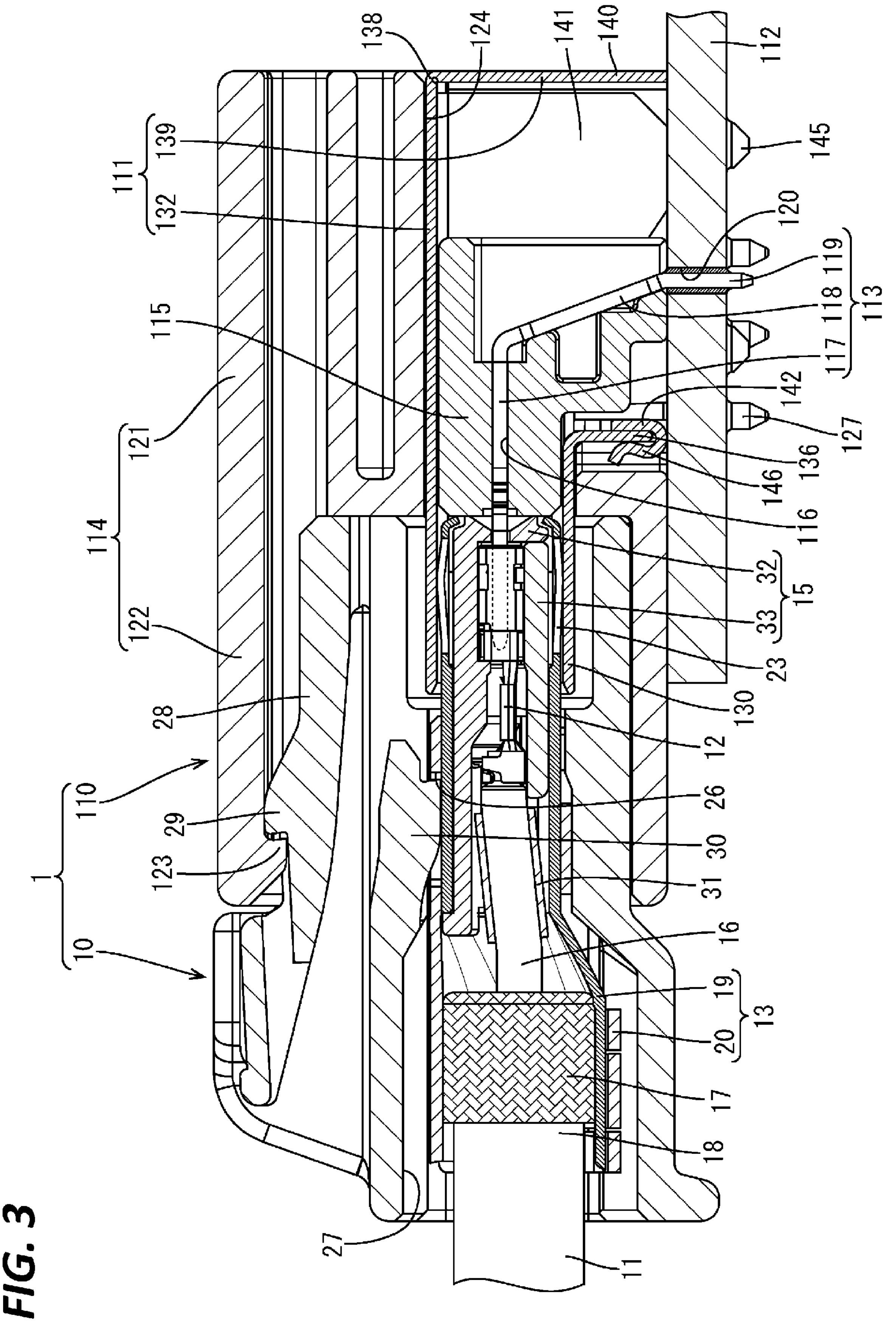
FIG. 3 is a side view in section showing a state where the cable-side connector and a first board-side connector are connected.

The cable-side connector 10 is described. As shown in FIGS. 1 and 2, the cable-side connector 10 includes cable-side inner conductors 12 connected to an end part of a cable 11, a cable-side outer conductor 13 made of metal for covering the cable-side inner conductors 12 while being electrically insulated from the cable-side inner conductors 12 and a cable-side connector housing 14 made of synthetic resin for holding the cable-side outer conductor 13. As shown in FIG. 3, a cable-side dielectric 15 is disposed between the cable-side inner conductors 12 and the cable-side outer conductor 13. The cable-side inner conductors 12 and the cable-side outer conductor 13 are electrically insulated by the cable-side dielectric 15.

As shown in FIG. 3, the cable 11 includes two coated wires 16 connected to the cable-side inner conductors 12, a shield portion 17 constituted by a braided wire for collectively covering the outer peripheries of the coated wires 16 and a sheath 18 made of insulating synthetic resin for covering the outer periphery of the shield portion 17.

In a front end part of the cable 11, the shield portion 17 exposed from an end of the stripped sheath 18 is folded onto an end part of the sheath 18. The two coated wires 16 projecting forward from the folded shield portion 17 are held by a clip 31 formed by bending a metal plate material.

The cable-side inner conductors 12 are accommodated inside the cable-side dielectric 15. The cable-side dielectric 15 is made of insulating synthetic resin. The cable-side dielectric 15 is formed into a rectangular parallelepiped shape long in a front-rear direction.

As shown in FIG. 3, the cable-side dielectric 15 includes an upper dielectric 32 open downward and a lower dielectric 33 to be assembled with the upper dielectric 32 from below. With the upper and lower dielectrics 32, 33 assembled, the two cable-side inner conductors 12 connected to the coated wires 16 are accommodated side by side in a lateral direction in the cable-side dielectric 15.

Figure 4:
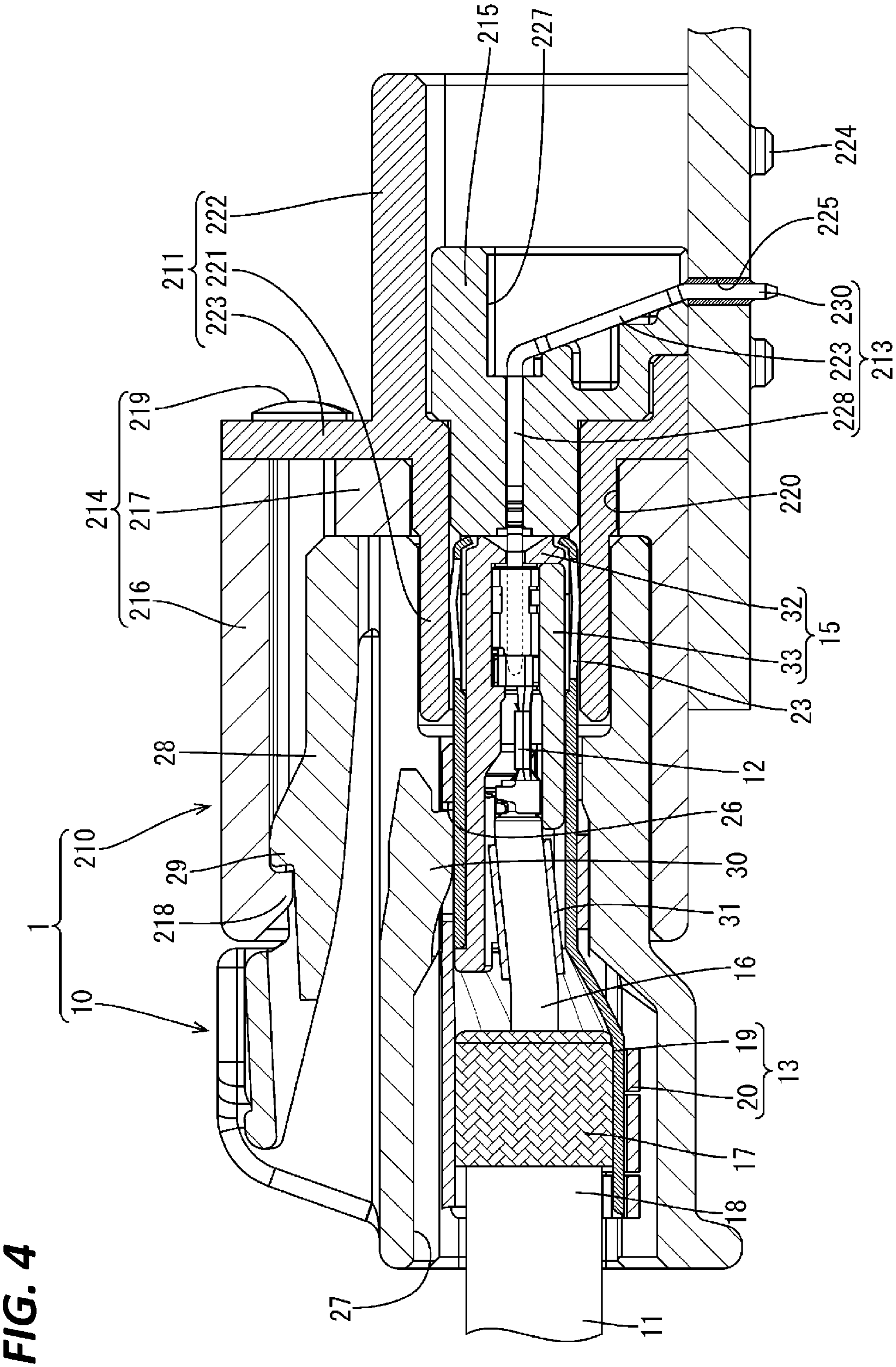
FIG. 4 is a side view in section showing a state where the cable-side connector and a second board-side connector are connected.

As shown in FIGS. 3 and 4, the cable-side outer conductor 13 is fittable and connectable to a first board-side outer conductor 111 of the first board-side connector 10 or a second board-side outer conductor 211 of the second board-side connector 210. As shown in FIG. 2, the cable-side outer conductor 13 is constituted by a lower outer conductor 19 for covering the outer periphery of the cable-side dielectric 15 and an upper dielectric 20 to be assembled with the lower outer conductor 19 to cover the lower outer conductor 19 and the outer periphery of the shield portion 17 folded onto the sheath 18.

The lower outer conductor 19 is formed by applying press-working or the like to an electrically conductive metal plate material. The lower outer conductor 19 includes a tubular portion 21 for accommodating the cable-side dielectric 15 as shown in FIG. 2.

As shown in FIG. 2, the tubular portion 21 is in the form of a rectangular tube substantially rectangular in a front view, and the first board-side outer conductor 111 or second board-side outer conductor 211 is fittable outside the tubular portion 21. Resiliently deformable resilient contact portions 23 projecting radially outwardly of the tubular portion 21 are formed at positions near a front end part of the tubular portion 21. The resilient contact portions 23 are provided in each of the upper, lower and both left and right surfaces of the tubular portion 21. If the tubular portion 21 is fit to the first board-side outer conductor 111 or second board-side outer conductor 211, the resilient contact portions 23 contact the inner wall of the first board-side outer conductor 111 or second board-side outer conductor 211 from inside.

The upper outer conductor 20 is formed by applying press-working or the like to an electrically conductive metal plate material. As shown in FIG. 2, the upper outer conductor 20 includes a covering portion 24 extending from the tubular portion 21 to the position of the shield portion 17 folded onto the sheath 18 and a connection barrel 25 provided on the rear edge of the covering portion 24.

The covering portion 24 is formed in such a size as to cover a region from a rear part of the tubular portion 21 to the shield portion 17 folded onto the sheath 18 from above. A square locking lance 26 is formed to penetrate in a vertical direction in the upper surface of the covering portion 24.

The connection barrel 25 is provided behind the covering portion 24. The connection barrel 25 is crimped to cover the outer periphery of the shield portion 17 folded onto the sheath 18. In this way, the cable-side outer conductor 13 constituted by the lower outer conductor 19 and the upper outer conductor 20 is electrically connected to the shield portion 17 of the cable 11.

As shown in FIG. 2, the cable-side connector housing 14 includes an accommodating portion 27 made of insulating synthetic resin and penetrating in the front-rear direction. A lock arm 28 extending rearward from a front end part of the cable-side connector housing 14 is formed on the upper surface of the cable-side connector housing 14. The lock arm 28 is in the form of a cantilever deflectable and deformable in the vertical direction with the front end part as a fulcrum. A lock projection 29 projecting upward is formed on the upper surface of the lock arm 28.

The accommodating portion 27 is formed into a substantially rectangular tube shape penetrating through the cable-side connector housing 14 in the front-rear direction. A locking lance 30 lockable to an edge part of the lance hole 26 provided in the cable-side outer conductor 13 is provided in the accommodating portion 27 (see FIGS. 3 and 4).

A tip part of the locking lance 30 is fit into the lance hole 26 and the locking lance 30 and the edge part of the lance hole 26 are locked as shown in FIGS. 3 and 4 if the cable-side outer conductor 13 is accommodated to a proper accommodation position of the accommodating portion 27. In this way, the cable-side outer conductor 13 is held retained in the cable-side connector housing 14.

[First Board-Side Connector 110]

Figure 5:
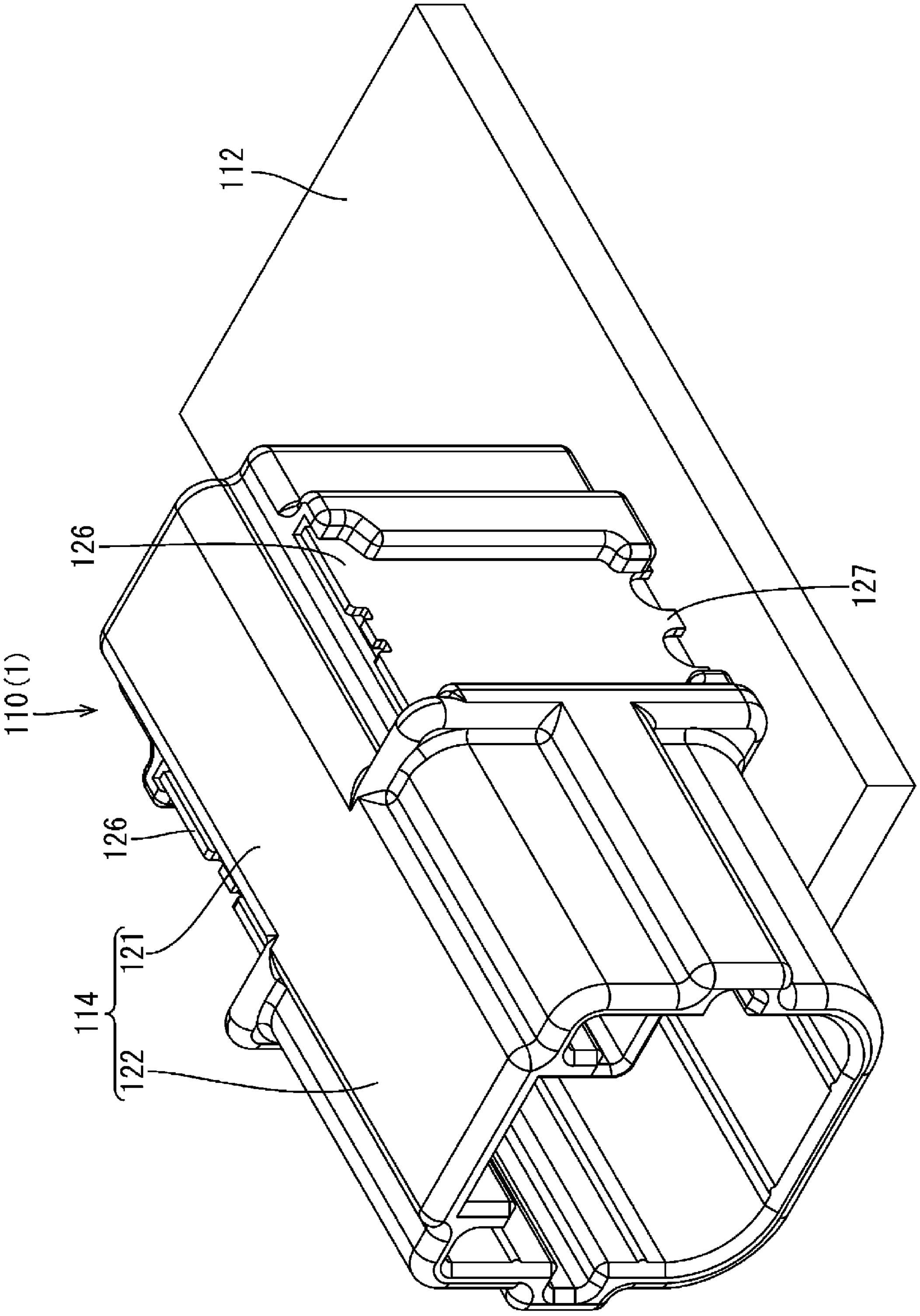
FIG. 5 is a perspective view showing the first board-side connector mounted on a first circuit board.
Figure 6:
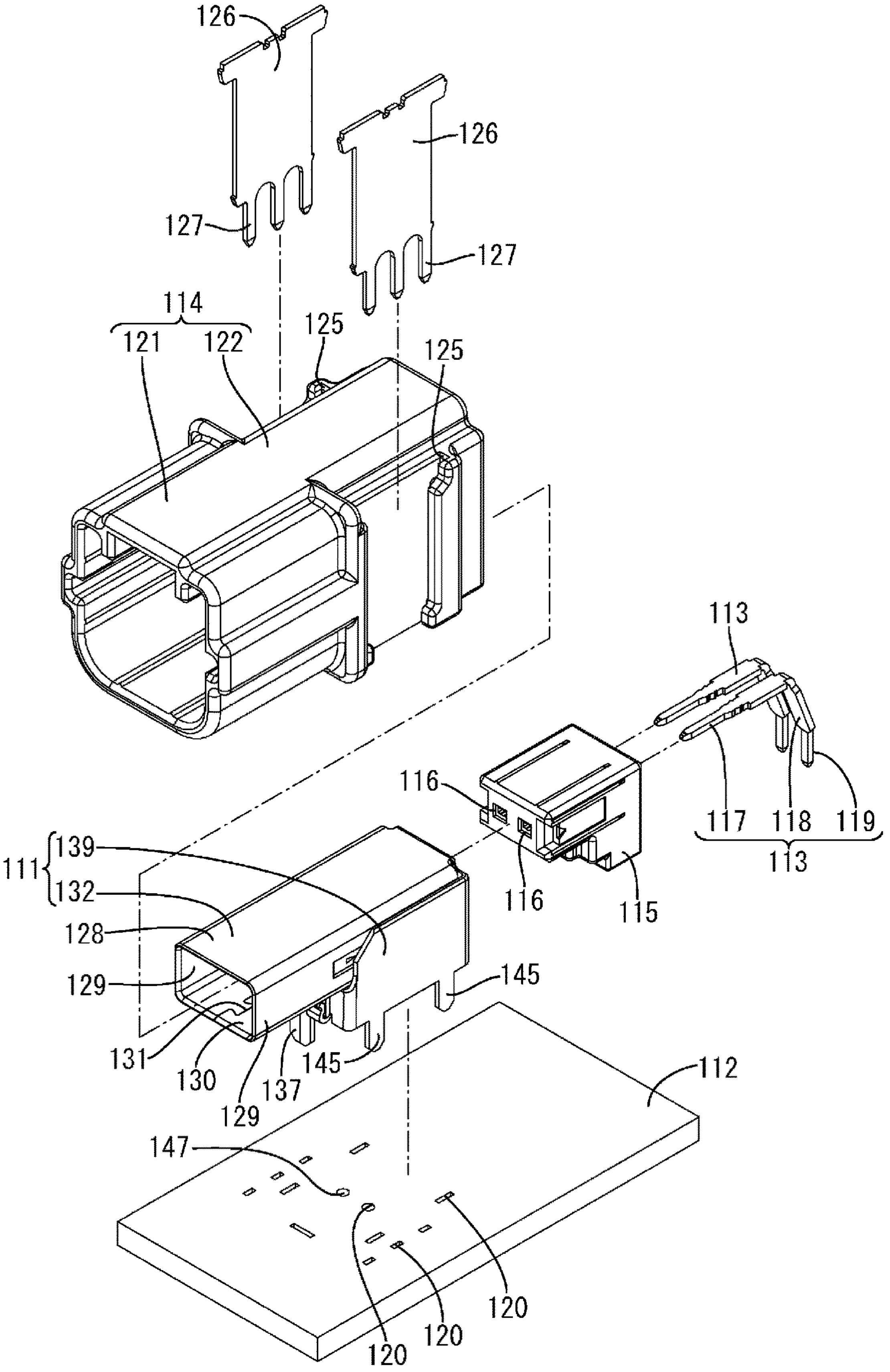
FIG. 6 is an exploded perspective view showing the first board-side connector.

As shown in FIG. 5, the first board-side connector 110 is mounted on a surface of the first circuit board 112. As shown in FIG. 6, the first board-side connector 110 is provided with first board-side inner conductors 113 made of electrically conductive metal, a first board-side outer conductor 111 made of metal for covering the first board-side inner conductors 113 while being electrically insulated from the first board-side inner conductors 113 and a first board-side connector housing 114 made of insulating synthetic resin for holding the first board-side outer conductor 111. A first board-side dielectric 115 made of insulating synthetic resin is disposed between the first board-side inner conductors 113 and the first board-side outer conductor 111. The first board-side inner conductors 113 and the first board-side outer conductor 111 are electrically insulated by the first board-side dielectric 115.

As shown in FIG. 6, the first board-side dielectric 115 is L-shaped when viewed laterally. The first board-side dielectric 115 includes a plurality of mounting holes 116 penetrating in the front-rear direction. The respective mounting holes 116 are paired in the lateral direction.

As shown in FIG. 6, the first board-side inner conductor 113 includes a straight portion 117 extending in the front-rear direction, a bent portion 118 extending obliquely downward from the rear end of the straight portion 117 and a connecting portion 119 extending downward from the lower end of the bent portion 118. A front part of the straight portion 117 is electrically connected to the cable-side inner conductor 112 mounted in the cable-side connector 10 at the time of connection to the cable-side connector 10 (see FIG. 3).

As shown in FIG. 3, the straight portion 117 of the first board-side inner conductor 113 is inserted into the mounting hole 116 of the first board-side dielectric 115. In this way, the first board-side inner conductor 113 is mounted in a state retained in the first board-side dielectric 115. As shown in FIG. 3, with the first board-side inner conductor 113 mounted in the first board-side dielectric 115, the front part of the straight portion 117 projects forward from the first board-side dielectric 115 and the bent portion 118 and the connecting portion 119 are arranged to extend downward. As shown in FIG. 3, the connecting portion 119 is inserted into a through hole 120 formed in the first circuit board 112 and soldered to an electrically conductive path 147 formed in the first circuit board 112. In this way, the electrically conductive path 147 of the first circuit board 112 and the first board-side inner conductor 113 are electrically connected.

As shown in FIG. 3, the first board-side connector housing 114 includes a housing base portion 121 having an accommodating portion 124 and a receptacle 122 projecting forward from the housing base portion 121. The cable-side connector 10 is fittable into the receptacle 122, and the receptacle 122 includes a claw portion 123 projecting downward and to be engaged with the lock projection 29 of the cable-side connector 10 on the front end of the inner surface of an upper wall.

The accommodating portion 124 penetrates through the housing base portion 121 in the front-rear direction and is open in the lower surface of the housing base portion 121. The first board-side outer conductor 111 can be accommodated into the accommodating portion 124 of the housing base portion 121.

As shown in FIG. 6, the first board-side connector housing 114 includes fixture mounting grooves 125 in both side surfaces of the housing base portion 121. Fixtures 126 made of a metal plate material are mounted into the respective fixture mounting grooves 125 from above. A plurality of (three in this embodiment) connecting portions 127 extend downward on a lower end part of the fixture 126. By soldering and fixing the connecting portions 127 to through holes 120 formed in the first circuit board 112, the first board-side connector 110 is fixed to the first circuit board 112.

The first board-side outer conductor 111 is formed by press-working and bending one metal plate material. As shown in FIG. 6, the first board-side outer conductor 111 includes a ceiling plate portion 128, two side plate portions 129 and a bottom plate portion 130. The ceiling plate portion 128 and the bottom plate portion 130 face each other in the vertical direction, and the respective side plate portions 129 face each other in a width direction (lateral direction). As shown in FIG. 6, the bottom plate portion 130 includes a mating end part 131 in a widthwise central part. End edges of the bottom plate portion 130 are convex-concavely engaged by dovetail fitting at the mating end part 131, whereby the opening of the first board-side outer conductor 111 can be prevented and the box shape thereof can be maintained.

The first board-side outer conductor 111 includes a tubular first fitting tube portion 132. The inside of the first fitting tube portion 132 defined by the ceiling plate portion 128, the respective side plate portions 129 and the bottom plate portion 130 penetrate in the front-rear direction. The first board-side dielectric 115 is held retained in the first fitting tube portion 132 while being inserted in the first fitting tube portion 132.

As shown in FIG. 3, the first board-side outer conductor 111 includes a projecting piece 136 in the form of a rectangular plate in a front view bent to extend downward from a rear end part of the bottom plate portion 130 of the first fitting tube portion 132. The projecting piece 136 is provided at a lateral center position of the bottom plate portion 130. As shown in FIG. 6, a connecting portion 137 extending downward is formed on a lower end part of the projecting piece 136. The connecting portion 137 is inserted into a through hole 120 formed in the first circuit board 112 and soldered, thereby being electrically connected to the electrically conductive path 147 of the first circuit board 112. The mating end part 131 is disposed at lateral center positions of the projecting piece 136 and the connecting portion 137.

As shown in FIG. 3, in the first board-side outer conductor 111, a lid member 139 is integrally formed to the ceiling plate portion 128 via a hinge portion 138 in a rear end part of the ceiling plate portion 128. The lid member 139 is formed rotatably about the hinge portion 138. As shown in FIG. 3, with the hinge portion 138 bent at a right angle, the lid member 139 integrally includes a back portion 140 having a rectangular shape in a back view and extending along the vertical direction and width direction, two side portions 141 projecting forward from both side ends of the back portion 140 and extending along the vertical direction and front-rear direction, and a covering portion 142 bridged between the front ends of the two side portions 141.

The back portion 140 has flat plate surfaces without unevenness on front and rear sides and is formed in such a size as to cover the entire rear opening of the board-side outer conductor (see FIG. 3).

The respective side portions 141 can cover rear parts of the outer surfaces (respective side surfaces) of the respective side plate portions 129 of the first board-side outer conductor 111.

As shown in FIG. 6, two connecting portions 145 arranged apart from each other in the front-rear direction are formed to extend downward on a lower end part of each side portion 141. The connecting portions 145 are inserted into through holes 120 formed in the first circuit board 112 and soldered, thereby being electrically connected to electrically conductive paths 147 of the first circuit board 112.

As shown in FIG. 3, hook-shaped clamping portions 146 extending downward and bent upward are formed apart from each other in the lateral direction in a lower end part of the covering portion 142. The clamping portion 146 is bent into a substantially S shape when viewed laterally. As shown in FIG. 3, the projecting piece 136 is clamped between the clamping portions 146 and the covering portion 142. In this way, the lid member 139 is suppressed from rotating about the hinge portion 138.

After the first board-side inner conductors 113 are mounted into the first board-side dielectric 115, the first board-side dielectric 115 is inserted into the first fitting tube portion 132 of the first board-side outer conductor 111 and, thereafter, the hinge portion 138 is bent, whereby the lid member 139 is rotated about the hinge portion 138 and a rear opening of the first fitting tube portion 132 is closed by the lid member 139.

[Second Board-Side Connector 210]

Figure 7:
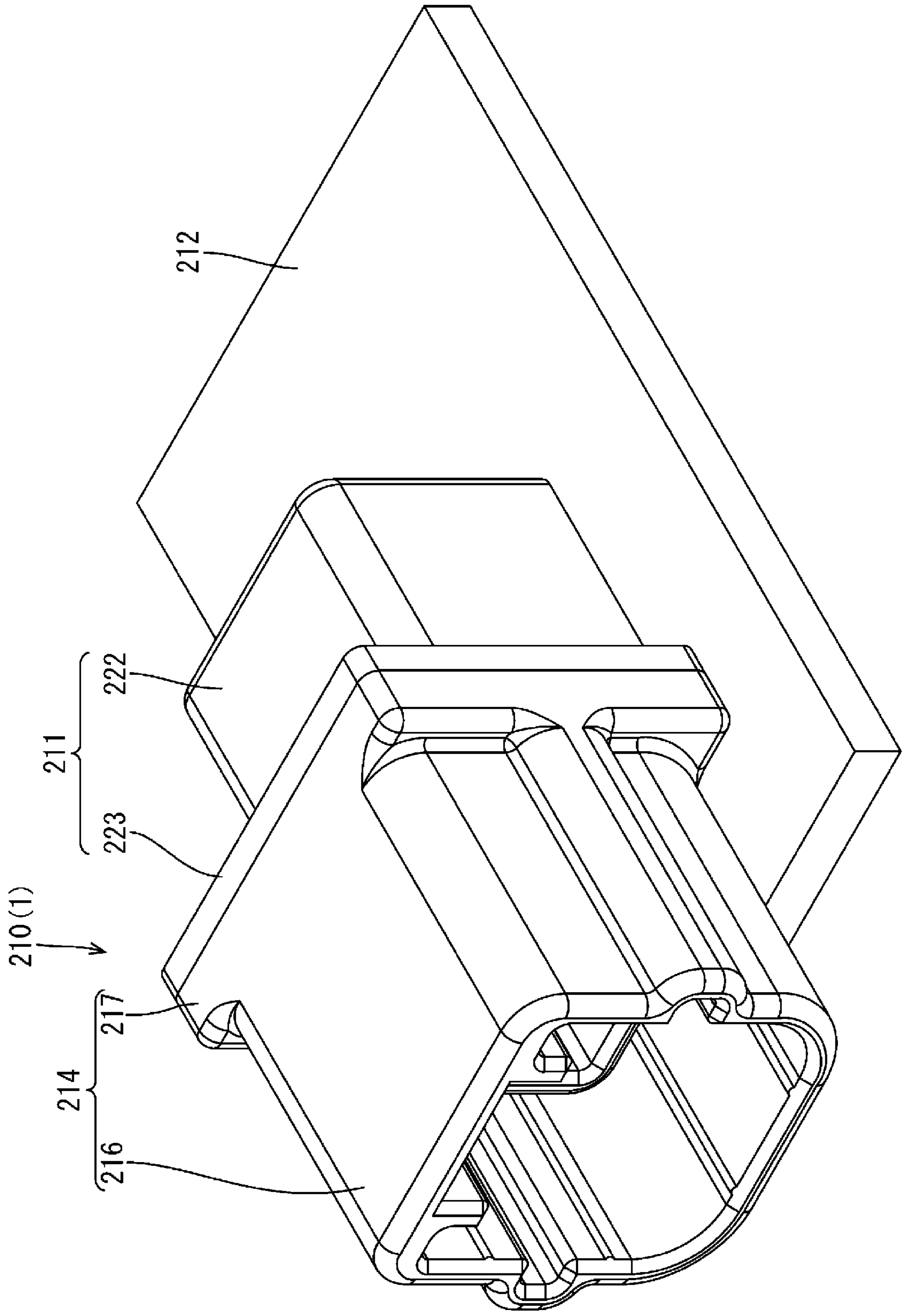
FIG. 7 is a perspective view showing the second board-side connector mounted on a second circuit board.
Figure 8:
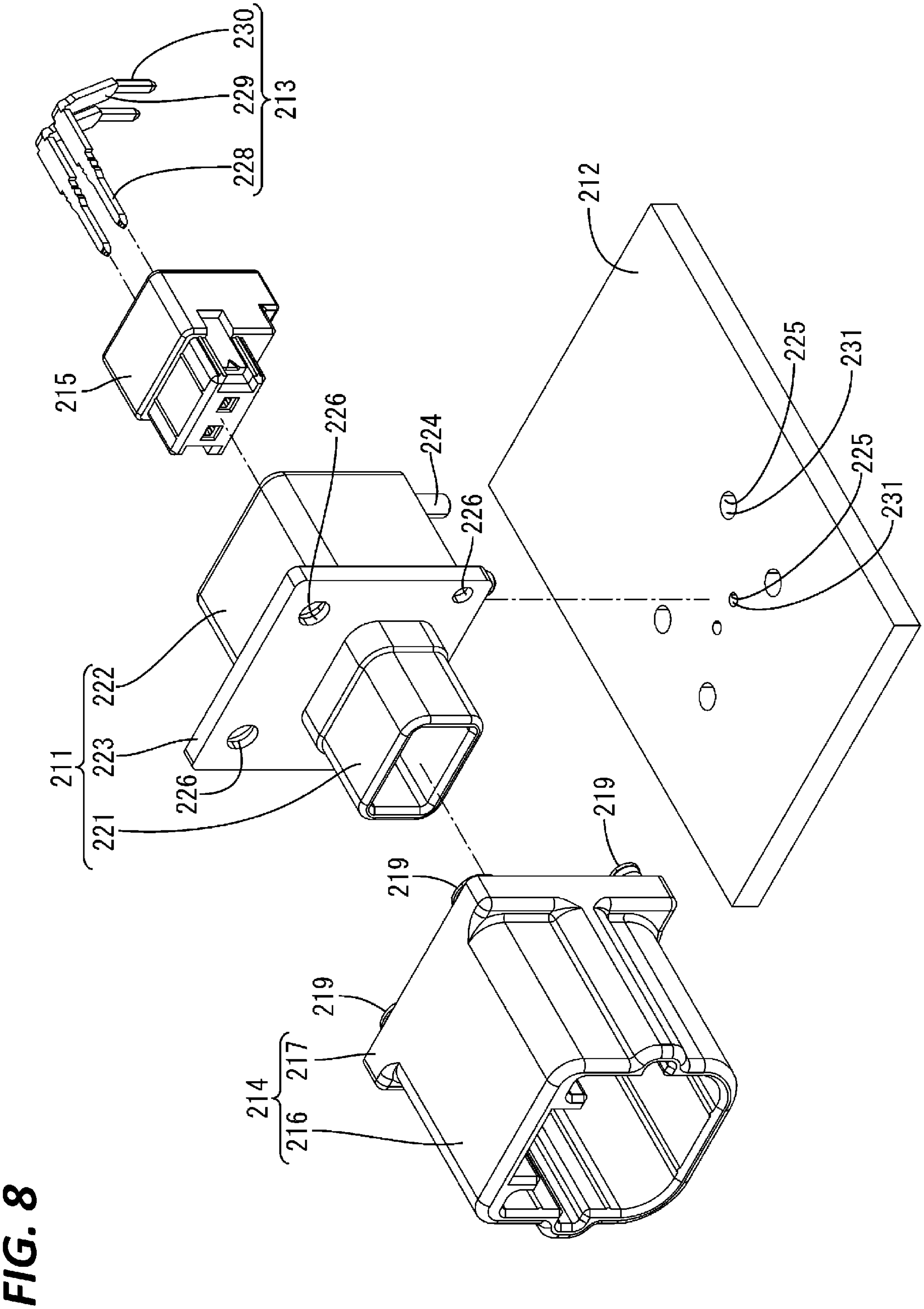
FIG. 8 is an exploded perspective view showing the second board-side connector.

As shown in FIGS. 7 and 8, the second board-side connector 210 is mounted on a surface of the second circuit board 212. As shown in FIG. 8, the second board-side connector 210 is provided with second board-side inner conductors 213 made of electrically conductive metal, a second board-side outer conductor 211 made of metal for covering the second board-side inner conductors 213 while being electrically insulated from the second board-side inner conductors 213 and a second board-side connector housing 214 made of insulating synthetic resin for holding the second board-side outer conductor 211. A second board-side dielectric 215 made of insulating synthetic resin is disposed between the second board-side inner conductors 213 and the second board-side outer conductor 211. The second board-side inner conductors 213 and the second board-side outer conductor 211 are electrically insulated by the second board-side dielectric 215.

The second board-side connector housing 214 is formed by injection-molding the insulating synthetic resin. The second board-side connector housing 214 includes a receptacle 216, which is open forward (an example of an opening direction) and into which the cable-side connector 10 is fit. As shown in FIG. 4, a back wall 217 is provided on a side of the second board-side connector housing opposite to an opening end part of the receptacle 216. A claw portion 218 projecting downward is formed to project downward on the front end edge (opening end part) of the upper wall of the receptacle 216. As shown in FIG. 4, the claw portion 218 is engaged with the lock projection 29 of the cable-side connector 10 fit in the receptacle 216, whereby the cable-side connector 10 is held in the receptacle 216.

Locking protrusions 219 projecting rearward are formed on four corner parts of the outer surface of the back wall 217. The locking protrusion 219 is formed into a cylindrical shape.

A mounting hole 220, through which the second board-side outer conductor 211 is inserted, is formed to penetrate through the back wall 217 in the front-rear direction. The mounting hole 220 has a rectangular cross-sectional shape with rounded corners.

The second board-side outer conductor 211 is made of electrically conductive metal. An arbitrary metal such as zinc, copper, copper alloy, aluminum or aluminum alloy can be appropriately selected as a metal for constituting the second board-side outer conductor 211. The second board-side outer conductor 211 is formed by a known method such as casting, die casting or cutting. In this embodiment, the second board-side outer conductor 211 is formed by casting or die casting. The second board-side outer conductor 211 electrically contacts the cable-side outer conductor 13 accommodated in the cable-side connector 10 (see FIG. 4).

As shown in FIG. 8, the second board-side outer conductor 211 includes a tube portion 221 extending in the front-rear direction and having a tubular shape, a dielectric surrounding portion 222 extending rearward from the rear end edge of the tube portion 221 and a flange 223 projecting in a direction intersecting the front-rear direction on a boundary part between the tube portion 221 and the dielectric surrounding portion 222.

The tube portion 221 has a rectangular cross-sectional shape with rounded corners. The outer shape of the tube portion 221 is set to be the same as or somewhat smaller than the inner shape of the mounting hole 220 of the back wall 217. In this way, the tube portion 221 is press-fit into the mounting hole 220.

As shown in FIG. 4, the dielectric surrounding portion 222 is open downward and rearward. The second board-side dielectric 215 is accommodated inside the dielectric surrounding portion 222 while being surrounded on upper, right and left sides by the dielectric surrounding portion 222.

A plurality of (four in this embodiment) cylindrical connecting portions 224 projecting downward are provided on a lower end part of the dielectric surrounding portion 222. The connecting portion 224 is inserted into a through hole 225 of the second circuit board 212 and connected to an electrically conductive path 231 formed on the inner surface of the through hole 225 by a known method such as soldering. In this way, the second board-side outer conductor 211 is electrically connected to the electrically conductive paths 231 formed in the second circuit board 212.

As shown in FIG. 4, with the tube portion 221 press-fit in the mounting hole 220, the flange 223 is in contact with the rear surface of the back wall 217 from behind.

As shown in FIG. 8, locking recesses 226 penetrating through the flange 223 in the front-rear direction are respectively formed at positions corresponding to the locking protrusions 219 of the back wall 217 on four corner parts of the flange 223. The locking recess 226 has a circular cross-sectional shape. The inner shape of the locking recess 226 is set to be substantially the same as the outer shape of the locking protrusion 219. After the locking protrusions 219 are passed through the locking recesses 226, end parts of the locking protrusions 219 are squeezed by being heated and pressurized, whereby the second board-side connector housing 214 and the second board-side outer conductor 211 are fixed.

The second board-side dielectric 215 is formed by injection-molding the insulating synthetic resin. As shown in FIG. 8, the second board-side dielectric 215 is formed into an L shape when viewed laterally. The second board-side dielectric 215 includes inner conductor accommodation chambers 227 capable of accommodating the second board-side inner conductors 213 inside. The inner conductor accommodation chambers 227 are formed to penetrate through the second board-side dielectric 215 in the front-rear direction and be open on a lower surface side.

As shown in FIG. 8, the second board-side inner conductor 213 is formed by bending a tab-like metal plate halfway and includes a straight portion 228 extending along the front-rear direction (direction along the plate surface of the second circuit board 212), a bent portion 229 bent with respect to the straight portion 228 and extending along a direction intersecting the plate surface of the second circuit board 212, and a connecting portion 230 extending downward from a lower end part of the bent portion 229.

As shown in FIG. 4, the cable-side inner conductor 12 accommodated in the cable-side connector 10 can contact the straight portion 228. The straight portion 228 projects further forward than the second board-side dielectric 215. On the other hand, the bent portion 229 is bent obliquely to a rear lower side with respect to the straight portion 228. The connecting portion 230 is inserted into a through hole 225 formed in the second circuit board 212 and soldered, thereby being electrically connected to an electrically conductive path 231 formed in the second circuit board 212.

[Connection Process of Cable-Side Connector 10 and First Board-Side Connector 110]

Next, an example of a connection process of the cable-side connector 10 and the first board-side connector 110 is described. The cable-side connector 10 is brought closer to the first board-side connector 110 fixed to the first circuit board 112. The cable-side connector 10 is inserted into the receptacle 122 of the first board-side connector 110. The lock arm 28 of the cable-side connector 10 is deflected and deformed downward by contacting the receptacle 122.

If the cable-side connector 10 is further pushed to the back of the receptacle 122, the resilient contact portions 23 provided in the cable-side outer conductor 13 of the cable-side connector 10 contact the inner wall of the first board-side outer conductor 111 of the first board-side connector 110. In this way, the first board-side outer conductor 111 and the cable-side outer conductor 13 are electrically connected.

If the cable-side connector 10 is further pushed to the back of the receptacle 122, the first board-side inner conductors 113 and the cable-side inner conductors 12 are electrically connected.

If the cable-side connector 10 is further pushed to the back of the receptacle 122, the lock arm 228 is restored and the claw portion 123 of the first board-side connector 110 is engaged with the lock projection 29 of the lock arm 28. In this way, the cable-side connector 10 and the first board-side connector 110 are connected (see FIG. 3).

[Connection Process of Cable-Side Connector 10 and Second Board-Side Connector 210]

Next, an example of a connection process of the cable-side connector 10 and the second board-side connector 210 is described. The cable-side connector 10 is brought closer to the second board-side connector 210 fixed to the second circuit board 212. The cable-side connector 10 is inserted into the receptacle 216 of the second board-side connector 210. The lock arm 28 of the cable-side connector 10 is deflected and deformed downward by contacting the receptacle 216.

If the cable-side connector 10 is further pushed to the back of the receptacle 216, the resilient contact portions 23 provided in the cable-side outer conductor 13 of the cable-side connector 10 contact the inner walls of the second board-side outer conductor 211 of the second board-side connector 210. In this way, the second board-side outer conductor 211 and the cable-side outer conductor 13 are electrically connected.

If the cable-side connector 10 is further pushed to the back of the receptacle 216, the second board-side inner conductors 213 and the cable-side inner conductors 12 are electrically connected.

If the cable-side connector 10 is further pushed to the back of the receptacle 216, the lock arm 28 is restored and the claw portion 218 of the second board-side connector 210 is engaged with the lock projection 29 of the lock arm 28. In this way, the cable-side connector 10 and the second board-side connector 210 are connected (see FIG. 4).

Functions and Effects of Embodiment

Next, functions and effects of this embodiment are described. According to this embodiment, since the cable-side outer conductor 13 and the cable-side inner conductors 12 of the cable-side connector 10 can be shared for two types of board-side connectors including the first board-side connector 110 and the second board-side connector 210, manufacturing cost can be reduced as compared to the case where the cable-side connectors 10 are individually designed for the two types of board-side connectors.

Further, since the cable-side connector housing 14 can also be shared, manufacturing cost can be further reduced.

Further, the connector system according to this embodiment includes the first board-side connector 110 having the first board-side outer conductor 111 formed from the bent metal plate material and the second board-side connector 210 having the second board-side outer conductor 211 formed by casting.

The manufacturing cost of the first board-side connector 110 can be reduced by forming the first board-side outer conductor 11 from the metal plate material. The shielding performance of the second board-side connector 210 can be improved by forming the second board-side outer conductor 211 by casting.

Further, according to this embodiment, the first board-side outer conductor 111 of the first board-side connector 110 includes the first fitting tube portion 132 having a tubular shape and to be fit to the cable-side outer conductor 13, the first fitting tube portion 132 includes the mating end part 131 where the end edges of the metal plate material constituting the first board-side outer conductor 111 are in contact with each other, the cable-side outer conductor 13 includes the resiliently deformable resilient contact portions 23, and the resilient contact portions 23 resiliently contact parts of the first fitting tube portion 132 different from the mating end part 131.

Since a resilient force from the first board-side outer conductor 111 is not applied to the mating end part 131, it is suppressed that the end edges of the metal plate material constituting the mating end part 131 are deformed away from each other.

Other Embodiments (1) Although one board-side connector is connected one cable-side connector 10 in the connector system 1 according to this embodiment, there is no limitation to this. One board-side connector may be connected to two or more cable-side connectors 10.

(2) Although the connector system 1 according to this embodiment includes two types of board-side connectors, there is no limitation to this and the connector system 1 may include three or more types of board-side connectors.

(3) The first board-side connector 110 and the second board-side connector 210 may be mounted on one circuit board.

LIST OF REFERENCE NUMERALS

1: connector system
10: cable-side connector
11: cable
12: cable-side inner conductor
13: cable-side outer conductor
14: cable-side connector housing
15: cable-side dielectric
16: coated wire
17: shield portion
18: sheath
19: lower outer conductor
20: upper outer conductor
21: tubular portion
23: resilient contact portion
24: covering portion
25: connection barrel
26: lance hole
27: accommodating portion
28: lock arm
29: lock projection
30: locking lance
31: clip
32: upper dielectric
33: lower dielectric
110: first board-side connector
111: first board-side outer conductor
112: first circuit board
113: first board-side inner conductor
114: first board-side connector housing
115: first board-side dielectric
116: mounting hole
117, 228: straight portion
118, 229: bent portion
119, 230: connecting portion
120, 225: through hole
121: housing base portion
122: receptacle
123: claw portion
124: accommodating portion
125: fixture mounting groove
126: fixture
127: connecting portion
128: ceiling plate portion
129: side plate portion
130: bottom plate portion
131: mating end part
132: first fitting tube portion
136: projecting piece
137: connecting portion
138: hinge portion
139: lid member
140: back portion
141: side portion
142: covering portion
145: connecting portion
146: clamping portion
147, 231: electrically conductive path
210: second board-side connector
211: second board-side outer conductor
212: second circuit board
213: second board-side inner conductor

214: second board-side connector housing
215: second board-side dielectric
216: receptacle
217: back wall
218: claw portion
219: locking protrusion
220 mounting hole
221: tube portion
222: dielectric surrounding portion
223: flange
224: connecting portion
226: locking recess
227: inner conductor accommodation chamber

What is claimed is:

1. A connector system, comprising:

a cable-side connector to be connected to an end part of a cable; and a plurality of types of board-side connectors to be connected to a circuit board, the cable-side connector including a cable-side inner conductor connected to the end part of the cable, a cable-side outer conductor made of metal for covering the cable-side inner conductor while being electrically insulated from the cable-side inner conductor, and a cable-side connector housing made of synthetic resin for holding the cable-side outer conductor, each of the plurality of types of board-side connectors including a board-side inner conductor to be connected to an electrically conductive path provided in the circuit board, a board-side outer conductor made of metal for covering the board-side inner conductor while being electrically insulated from the board-side inner conductor, and a board-side connector housing made of synthetic resin for holding the board-side outer conductor, the cable-side inner conductor and the board-side inner conductor being electrically connectable, the cable-side outer conductor and the board-side outer conductor being electrically connectable, and the cable-side connector housing and the board-side connector housing being connectable, the plurality of types of board-side connectors including mutually different board-side outer conductors, one board-side connector selected from the plurality of types of board-side connectors being connected to the cable-side connector, the plurality of types of board-side connectors including a first board-side connector having a first board-side outer conductor formed from a bent metal plate material and a second board-side connector having a second board-side outer conductor formed by casting, the second board-side connector including the second board-side outer conductor and a second board-side connector housing made of synthetic resin for holding the second board-side outer conductor, the second board-side outer conductor including a tube portion extending in a front-rear direction and having a tubular shape and a flange projecting in a direction intersecting the front-rear direction on a rear end of the tube portion, the second board-side connector housing including a receptacle open forward, a mounting hole being formed to penetrate through a back wall of the receptacle in the front-rear direction, and the flange contacting a rear surface of the back wall from behind with the tube portion press-fit in the mounting hole.

2. The connector system of claim 1, wherein:

the first board-side outer conductor of the first board-side connector includes a first fitting tube portion having a tubular shape and to be fit to the cable-side outer conductor, the first fitting tube portion includes a mating end part where end edges of the metal plate material constituting the first board-side outer conductor are in contact with each other, and the cable-side outer conductor includes a resiliently deformable resilient contact portion and the resilient contact portion resiliently contacts a part of the first fitting tube portion different from the mating end part.

* * * * *